United States Patent
Bailey et al.

(10) Patent No.: US 7,416,771 B2
(45) Date of Patent: Aug. 26, 2008

(54) MODULATOR INTERCHANGEABLE FLOOR MATS

(75) Inventors: Bob Bailey, Charlton, NY (US); Patrick E. Hudkins, Saratoga Springs, NY (US)

(73) Assignee: Racemark International, Inc., Malta, NY (US)

( * ) Notice: Subject to any disclaimer, the term of this patent is extended or adjusted under 35 U.S.C. 154(b) by 142 days.

(21) Appl. No.: 11/116,091

(22) Filed: Apr. 27, 2005

(65) Prior Publication Data

US 2006/0246255 A1 Nov. 2, 2006

(51) Int. Cl.
*B32B 3/06* (2006.01)
(52) U.S. Cl. .............................. 428/83; 428/95; 428/99; 428/100; 428/120; 296/97.23; 15/215; 15/217
(58) Field of Classification Search .................. 428/83, 428/95, 99, 100, 120; 296/97.23; 15/215, 15/217
See application file for complete search history.

(56) References Cited

U.S. PATENT DOCUMENTS

| | | | | |
|---|---|---|---|---|
| D174,796 S | | 5/1955 | Caldwell ......................... D9/6 |
| 3,577,581 A | * | 5/1971 | Stata ........................... 15/215 |
| 3,578,738 A | * | 5/1971 | Hughes ........................ 15/215 |
| 3,708,833 A | * | 1/1973 | Ribich et al. .................. 24/450 |
| 4,361,925 A | | 12/1982 | Yamamoto et al. ............ 15/217 |
| 4,692,364 A | | 9/1987 | Altus ........................... 428/85 |
| 5,018,235 A | | 5/1991 | Stamatiou et al. ............. 15/215 |
| 5,171,619 A | | 12/1992 | Reuben ........................ 428/95 |
| 5,227,214 A | * | 7/1993 | Kerr et al. ..................... 428/95 |
| 5,316,817 A | | 5/1994 | Timperley ..................... 428/78 |
| 5,332,347 A | * | 7/1994 | Kimisawa .................... 411/182 |
| 5,725,926 A | | 3/1998 | Wang ........................... 428/78 |
| 5,891,546 A | | 4/1999 | Sherman ....................... 428/88 |
| 5,919,540 A | | 7/1999 | Bailey .......................... 428/67 |
| 6,027,782 A | | 2/2000 | Sherman ....................... 428/88 |
| 6,238,765 B1 | | 5/2001 | Bailey et al. .................. 428/95 |
| 6,303,068 B1 | | 10/2001 | Kerr et al. .................... 264/293 |
| 6,382,350 B1 | | 5/2002 | Jezewski et al. ............. 181/290 |
| D467,854 S | | 12/2002 | Takahashi et al. .......... D12/203 |
| 6,595,321 B1 | | 7/2003 | Tompson .................... 181/290 |
| 2001/0000233 A1 | | 4/2001 | Bailey et al. .................. 428/99 |
| 2002/0187300 A1 | | 12/2002 | Nakasuji et al. .............. 428/95 |
| 2004/0053002 A1 | | 3/2004 | Kobayashi et al. ............ 428/95 |

FOREIGN PATENT DOCUMENTS

| | | |
|---|---|---|
| DE | 8911331 | 11/1989 |
| FR | 2617102 | 12/1988 |
| FR | 2859673 | 3/2005 |
| JP | 2004/098720 | 4/2004 |
| WO | WO 9819880 | 5/1998 |

* cited by examiner

*Primary Examiner*—Alexander Thomas
(74) *Attorney, Agent, or Firm*—Heslin Rothenberg Farley & Mesiti P.C.

(57) ABSTRACT

A modular interchangeable floor mat includes a mat frame and a mat insert. The mat frame includes a central portion having a plurality of integrally formed upwardly-extending hooked nibs and a peripheral edge. The mat insert includes a hook-retaining material defining a bottom surface. The hook-retaining material may include a nonwoven material or a reticulated foam. The plurality of upwardly-extending hooked nibs of the mat frame is engageable with the hook-retaining material of the mat insert. The mat frame may also include a plurality of integrally formed downwardly-depending nibs or ridges.

31 Claims, 6 Drawing Sheets

MODULAR INTERCHANGEABLE FLOOR MATS

FIELD OF THE INVENTION

This invention relates to floor mats, and more particularly to modular interchangeable floor mats for use in vehicles.

BACKGROUND OF THE INVENTION

It is often desirable to protect factory installed carpeting in a vehicle, and particularly, carpeted floorboards from wear and tear.

Conventionally, vehicle floor mats typically include solid rubber floor mats, and carpeted floor mats which are placed over the carpeted floorboards of the vehicle. Recent attempts have focused on floor mats having a base portion and a releasably attachable top portion.

There is a need for further modular interchangeable floor mats.

SUMMARY OF THE INVENTION

The present invention provides, in a first aspect, a floor mat which includes a mat frame and a mat insert. The mat frame includes a central portion having a plurality of integrally formed upwardly-extending hooked nibs and a peripheral edge. The mat insert includes a hook-retaining material defining a bottom surface. The plurality of upwardly-extending hooked nibs of the mat frame is engageable with the hook-retaining material of the mat insert.

The present invention provides, in a second aspect, a mat frame for use in a floor mat with a mat insert in which the mat frame includes a central portion having a plurality of integrally formed upwardly-extending hooked nibs, at least one of a plurality of integrally formed downwardly-depending nibs and a plurality of integrally formed downwardly-depending ridges, and a peripheral edge having an integrally formed inwardly-extending portion defining a recess for receiving a peripheral edge of the mat insert.

The present invention provides, in a third aspect, a floor mat which includes a mat frame and a mat insert. The mat insert has a carpeted face layer and a hook-retaining material defining a bottom surface. The mat frame includes a central portion having a plurality of integrally formed upwardly-extending hooked nibs, at least one of a plurality of integrally formed downwardly-depending nibs and a plurality of integrally formed downwardly-depending ridges, and a peripheral edge having an inwardly-extending portion defining a recess for receiving a peripheral edge of the mat insert, and an outwardly and downwardly-extending leg having a bottom portion disposed below a bottom surface of the central portion. The plurality of upwardly-extending hooked nibs of the mat frame is engageable with the hook-retaining material of the mat insert.

BRIEF DESCRIPTION OF THE DRAWINGS

The present matter which is regarded as the invention is particularly pointed out and distinctly claimed in the concluding portion of the specification. The present invention, however, may best be understood by reference to the following detailed description of various embodiments and the accompanying drawings in which:

DETAILED DESCRIPTION OF THE INVENTION

Figure 1:
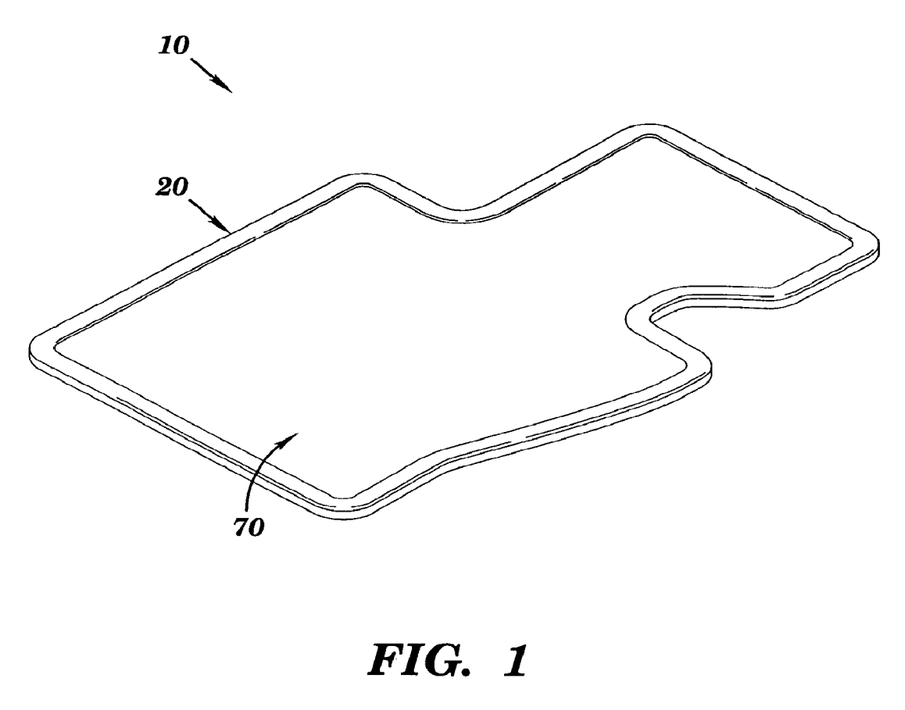
FIG. 1 is a perspective view of a modular interchangeable floor mat in accordance with the present invention.
Figure 2:
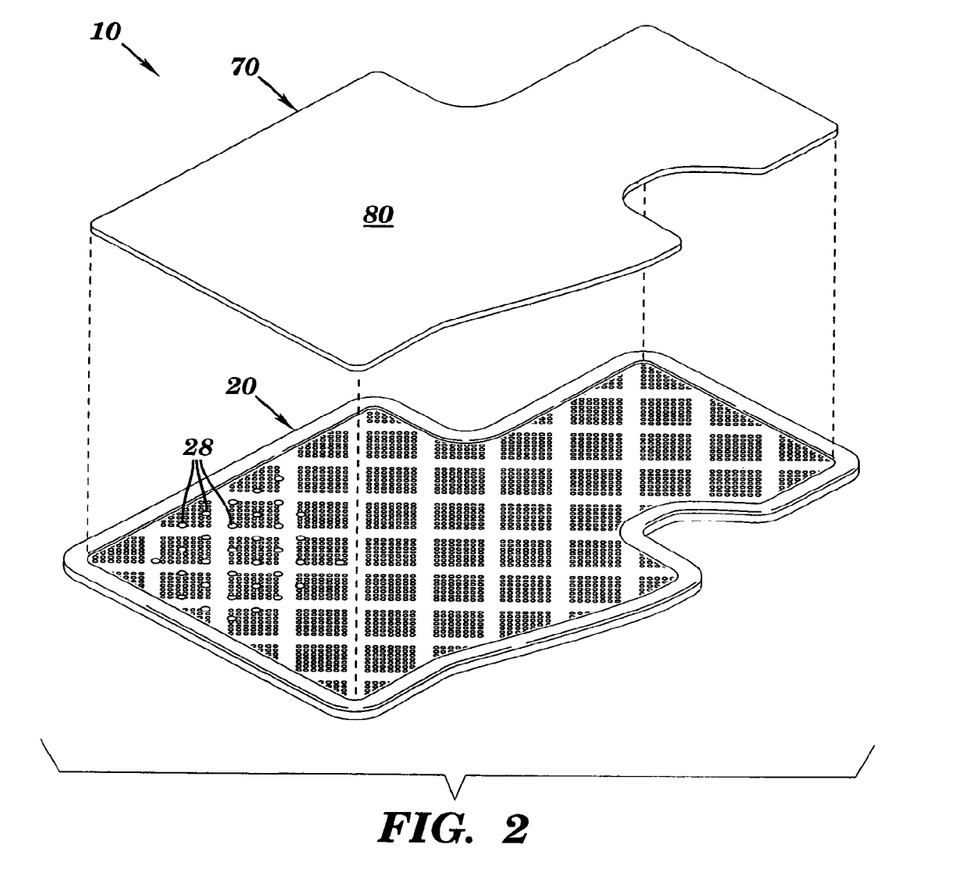
FIG. 2 is an exploded, perspective view of the modular interchangeable floor mat of FIG. 1.

FIGS. 1 and 2 illustrate one embodiment of a modular interchangeable floor mat 10 in accordance with the present invention that generally includes a mat frame 20, and a mat insert 70 that is engageable with and receivable in mat frame 20. As described in greater detail below, the bottom of the mat insert and the top of the mat frame are configured to engage each other to inhibit separation and/or lateral movement between the mat insert and the mat frame. Floor mat 10 may be sized and configured to rest on a carpeted floorboard of an automobile or other motor vehicle (not shown), typically on the driver side, the front passenger side and/or the rear passenger sides. The principles of the present invention are also applicable to other types of floor mats.

Figure 3:
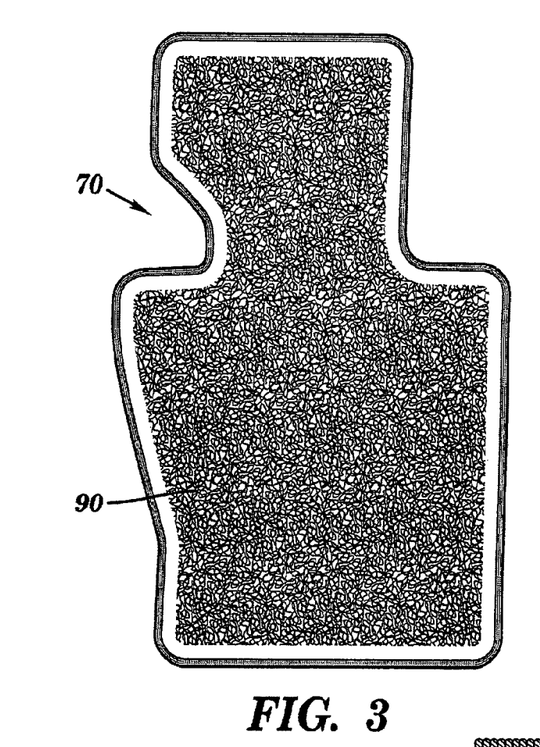
FIG. 3 is a bottom view of the mat insert of FIG. 1.
Figure 4:
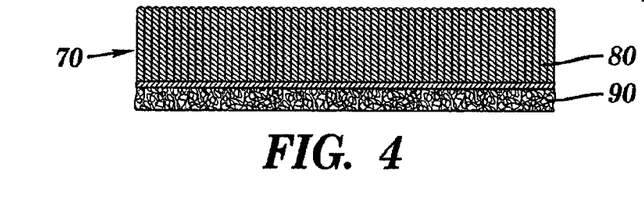
FIG. 4 is an enlarged, cross-sectional view of the mat insert of FIG. 1.
Figure 5:
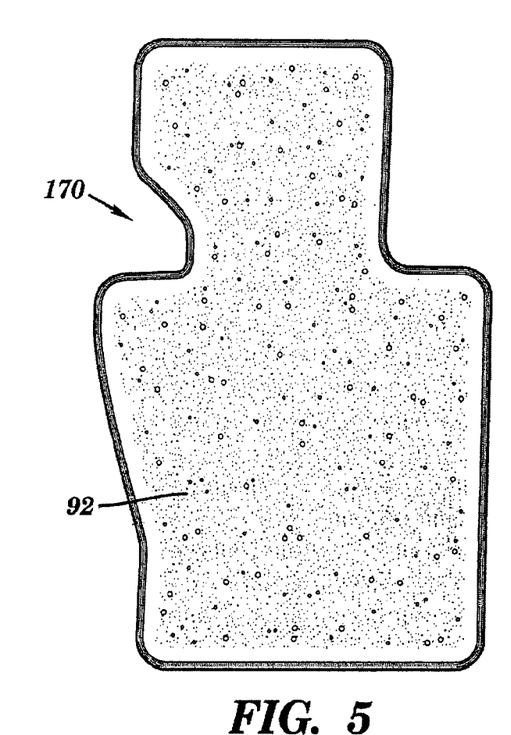
FIG. 5 is a bottom view of another embodiment of a mat insert in accordance with the present invention.

As shown in FIGS. 3 and 4, mat insert 70 may include a face layer 80 having a hook-retaining material 90 defining the bottom surface. The hook-retaining material may be a non-woven material having, for example, interlocking layers or networks of fibers, filaments, or film-like filamentary structures, and may be formed by needle punching, stitch-bonding, spun bonding, wet laying, and other processes as know in the art. Suitable materials for forming the nonwoven may include polypropylene and polyester. In addition, as shown in FIG. 5, in another embodiment, a mat insert 170 may include a hook-retaining material 92 formed from a reticulated foam having a plurality of open pores. The reticulated foam may be produced using an explosion process and/or a chemical process as is know in the art. A suitable material for forming the reticulate foam includes polyurethane. The face layer may comprise loop, cut or combination loop and cut pile, woven, knitted, tufted, needle punched carpet or otherwise constructed and produced using any textile fiber, e.g., nylon, polyester, polypropylene, or natural or synthetic materials, or combinations thereof, etc., in any construction, design, pattern, gauge, stitches/inch, etc. The face layer and hook-retaining material may be attached together with an adhesive or bonded together during an extrusion process with a TPO (thermoplastic olefin) material.

Figures 6, 7, 8:
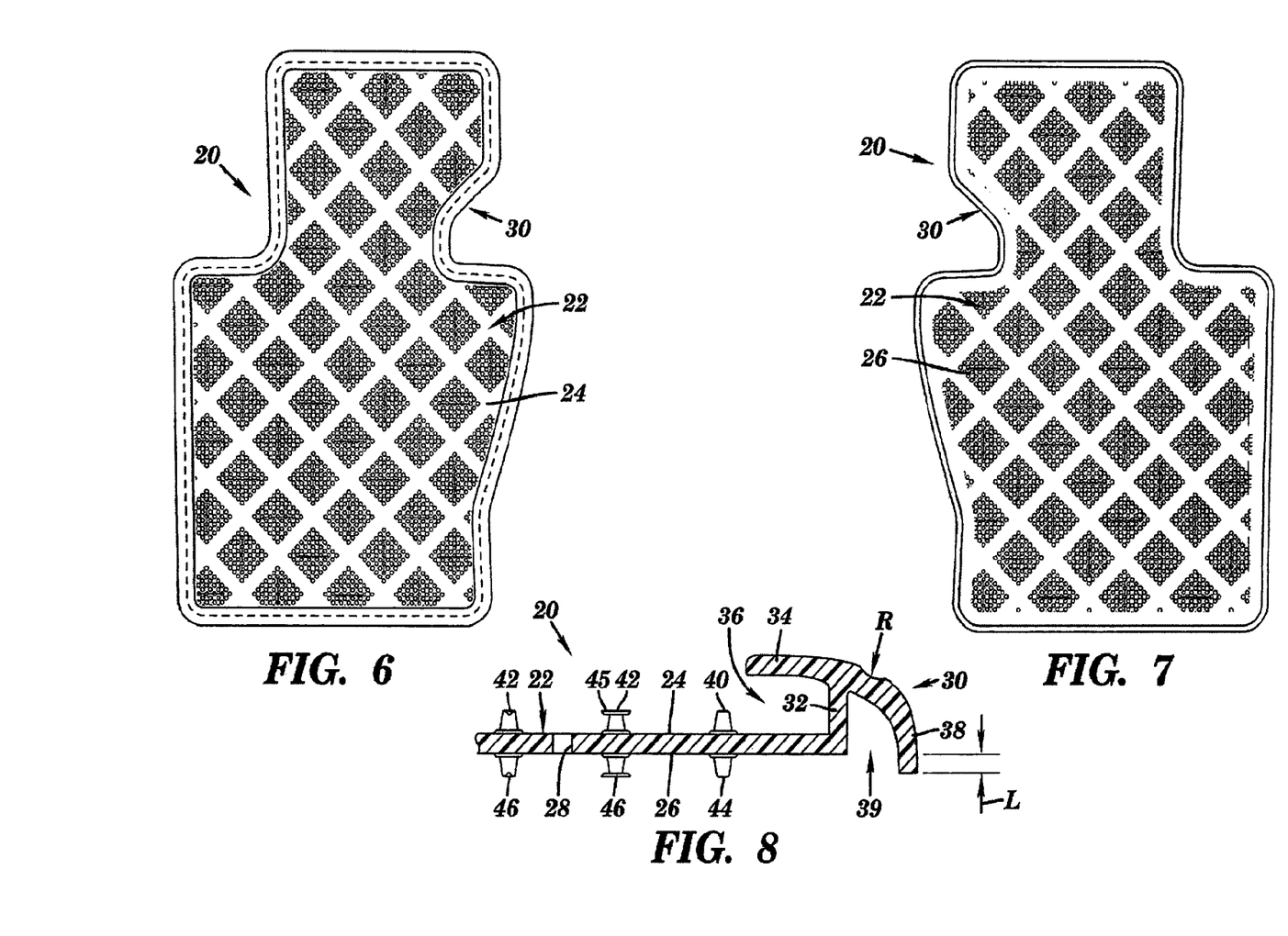
FIG. 6 is a top view of the mat frame of FIG. 1.
FIG. 7 is a bottom view of the mat frame of FIG. 1.
FIG. 8 is an enlarged, cross-sectional view of a peripheral edge portion of the mat frame of FIG. 1.

As shown in FIGS. 6-8, mat frame 20 includes a generally central portion 22 and peripheral edge 30. A top surface 24 of mat frame 20 may include a plurality of integrally formed upwardly-extending nibs 40 and hooked nibs 42. A bottom surface 26 of mat frame 20 may include a plurality of integrally formed downwardly-depending nibs 44 and hooked nibs 46. Hooked nibs 42 and 46, may be tapered projections, fruostoconically-shaped, extending from the surfaces of central portion 22. The upwardly-extending nibs and hooked nibs are intended to engage the hook-retaining material of the mat insert and/or inhibit separation and lateral movement between the mat insert and the mat frame. Integrally forming the upwardly-extending nibs and hooked nibs eliminates the manufacturing step of attaching a separate attachment means to the mat frame. The thickness of the hook-retaining material and the height of the nibs and hooked nibs may be suitably selected so that the nibs and the hooks are embedded in the hook-retaining material when the two are pressed against each other. The bottom nibs and the hooked nibs are intended to engage the carpet of the floorboard and inhibit separation and/or lateral movement of the mat frame relative to the floorboard.

The hooked nibs may include a projection such as a pair of outwardly-extending, generally elongated portions 45. The pair of outwardly-extending portions may extend generally orthogonally from the axis of the projection. The hooked nibs may also include other configurations such as a single outwardly-extending projection. From the present description, it will be appreciated by those skilled in the art that other hook configurations which engage or interlock with the hook-retaining material of the mat insert and/or fibers of the carpeted floorboard would be equally suitable.

With reference to FIG. 8, peripheral edge 30 of mat frame 20 may include an integrally formed upwardly-extending wall 32, an inwardly-extending portion 34 attached to wall 32 and spaced-apart from central portion 22 to define a peripherally-extending recess 36 for receiving a peripheral edge of mat insert 70. The width of the recess may be sized to receive the peripheral edge of mat insert 70 and hold the mat insert tightly in place relative to the mat frame. In addition, peripheral edge 30 may include a leg 38 that extends laterally outward and downward from the peripheral edge of mat frame 20 to form a downwardly open peripherally-extending channel 39. The leg may extend below the bottom surface of mat frame 20 to dig into the carpeted floorboard (e.g., act as a large elongated nib) and further inhibit movement between the floor mat and the carpeted floorboard. A cutout having a radius R may be formed in leg 38 for providing a more aesthetically pleasing peripheral edge to the floor mat compared to a simple rounded peripheral edge. As further shown in FIGS. 2 and 8, a plurality of through-holes 28 may be provided in mat frame 20 to facilitate sound absorption. The plurality of through-holes may be disposed between the nibs or in place of some of the nibs. The plurality of through-holes may extend over a portion or the entire surface of the mat frame. In addition, a hole in each of the mat insert and mat frame may be aligned to receive an upwardly-extending hook attached to a floorboard to further inhibit separation and/or lateral movement of the floor mat relative to the floorboard.

Figures 9, 10, 11:
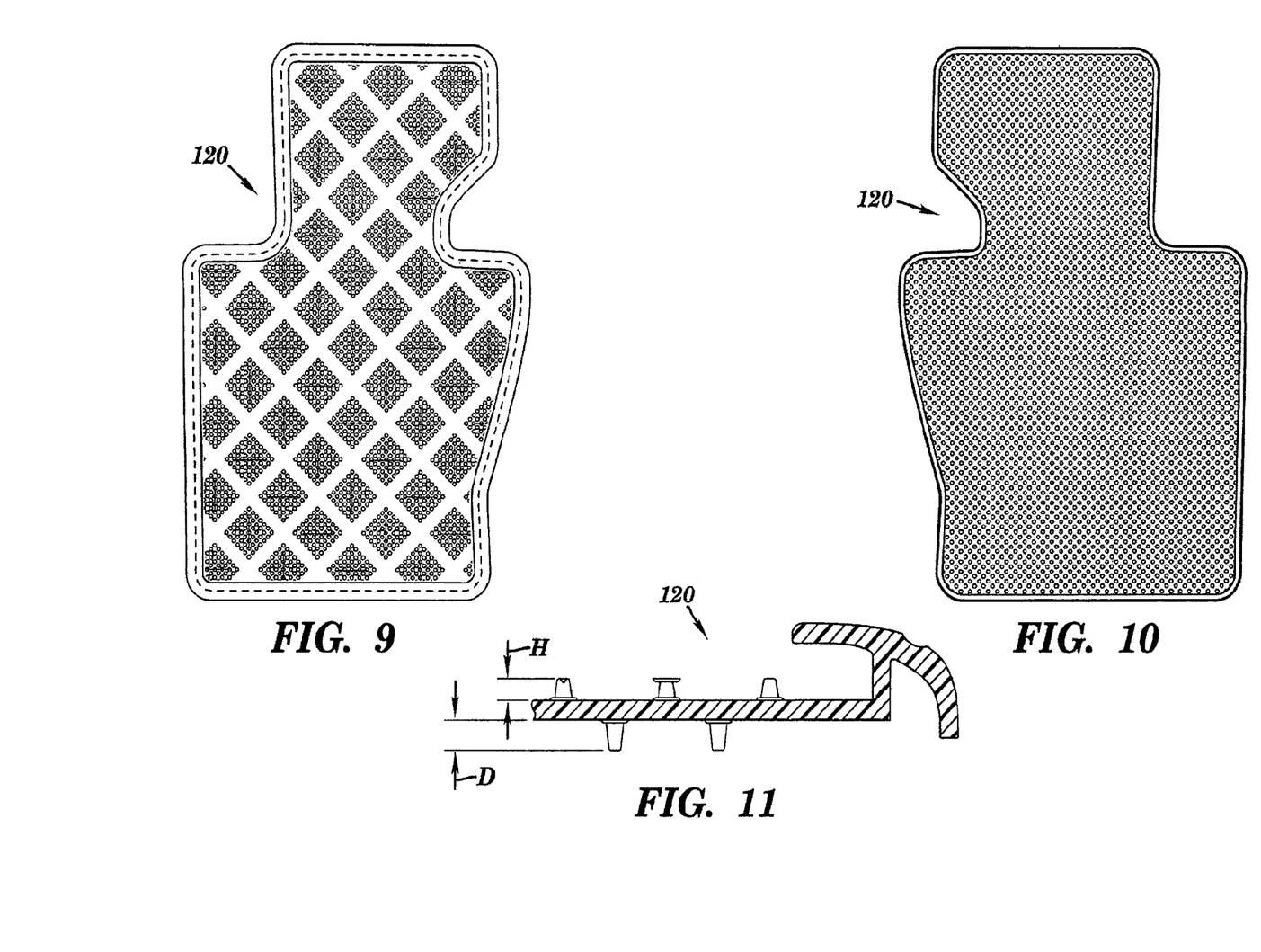
FIG. 9 is a top view of another embodiment of a mat frame in accordance with the present invention.
FIG. 10 is a bottom view of the mat frame of FIG. 9.
FIG. 11 is an enlarged cross-sectional view of a peripheral edge portion of the mat frame of FIG. 9.

FIGS. 9-11 illustrate another embodiment of a mat frame 120 in accordance with the present invention that is essentially the same as mat frame 20 with the exception that the upwardly-extending nibs and hooked nibs comprise a height H and the downwardly-depending nibs comprise a depth D and wherein the height is less than the depth. In addition, the nibs on the bottom of the mat frame may be generally evenly spaced-apart along the bottom surface of the mat frame. The deeper nibs on mat frame 120 increase the engagement and holding ability between the mat frame and a carpeted floorboard, and in particular, between the mat frame and a cut pile carpeted floorboard.

Figures 12, 13, 14:
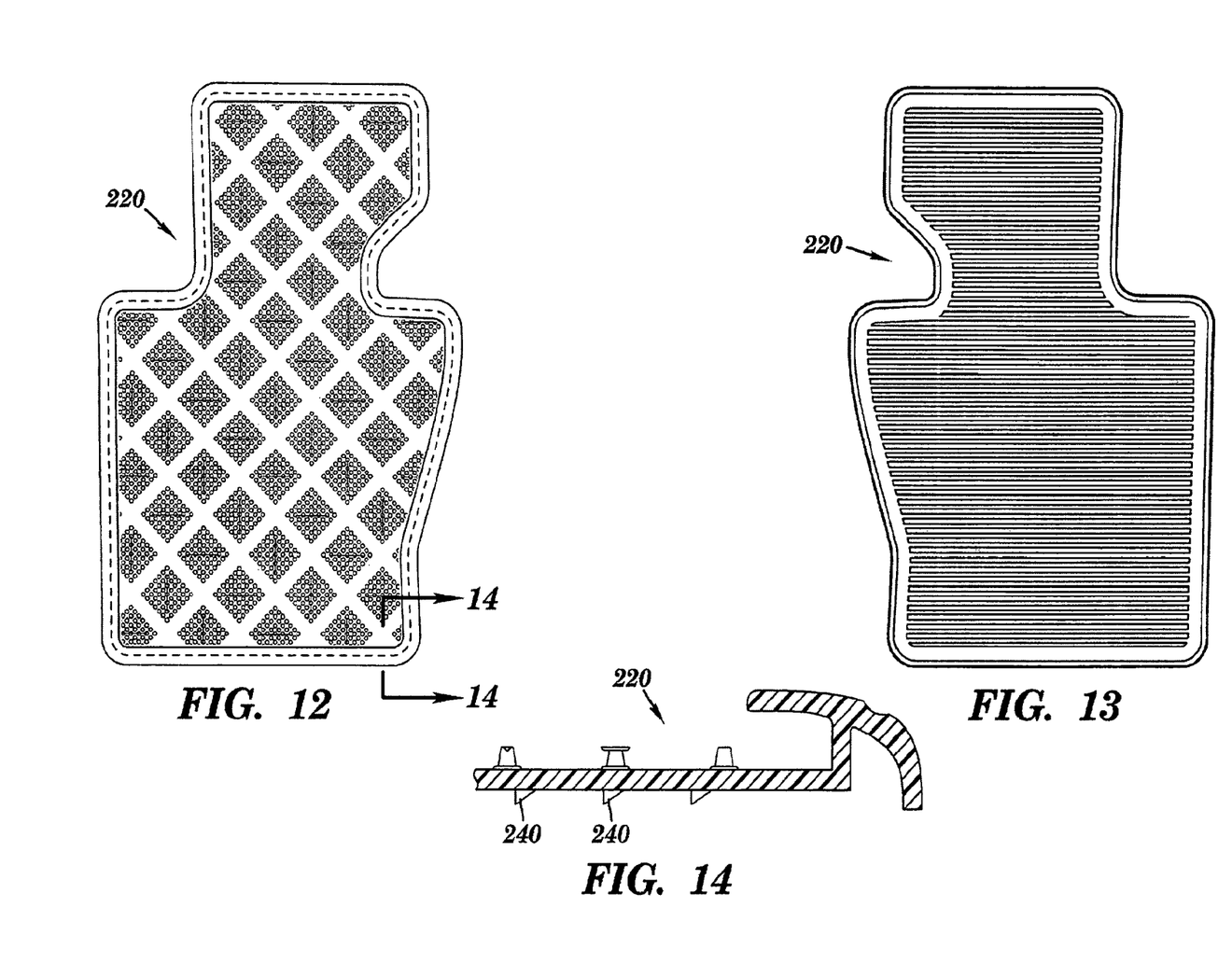
FIG. 12 is a top view of another embodiment of a mat frame in accordance with the present invention.
FIG. 13 is a bottom view of the mat frame of FIG. 12.
FIG. 14 is an enlarged, cross-sectional view of a peripheral edge portion of the mat frame taken along line 14-14 in FIG. 12.

FIGS. 12-14 illustrate another embodiment of a mat frame 220 in accordance with the present invention that is essentially the same as mat frame 20 with the exception that the bottom of the mat frame includes a plurality of parallel elongated ridges 240. In addition, the elongated ridges may have a depth that is less than the height of the upwardly-extending nibs and hooked nibs. The ridges may be configured and disposed so that the vertical portions of the ridges engage the carpeted floorboard when the mat frame is pushed forward, e.g., when an operator of a vehicle pushes the floor mat forward with his foot.

In connection with the various embodiments, the nibs may have a height on the order of about $\frac{1}{32}$ inch to about $\frac{3}{10}$ inch (about 0.8 mm to about 7.6 mm) and a spaced-apart distribution of about $\frac{1}{4}$ inch to about 1 inch (about 6.4 mm to about 25.4 mm). The outwardly-extending portion of the nib may have a length extending from the side of the nib of about 0.16 inch (about 4 mm) or less. The mat frame may be fabricated from an elastic material so that the hooked nibs are disengageable from the hook-retaining material of the mat insert and the loop-pile fibers of the carpeted floorboard generally without breaking or damaging the hook-retaining material and the loop-pile fibers of the carpeted floor board. For example, the mat frame, and thus, the integrally formed hooked nibs are desirably formed from a heat formable/curable, elastomer or rubber-like material such as a thermoplastic elastomer such as a thermoplastic olefin elastomer. The hooked nibs and various other suitable configurations of hooked nibs are described in U.S. Pat. No. 6,238,765 issued to Bailey et al., entitled "Vehicle Floor Mat", the entire subject matter being incorporated herein by reference.

In addition, the plurality of outwardly extending portions or hooks may be orientated in the same (e.g., unidirectional or aligned) or in different directions (e.g., multidirectional). As shown in FIGS. 6 and 7, the nibs and hooked nibs may be distributed over some or substantially the entire bottom surface of the central portion of the mat frame. In this illustrated embodiment, a plurality of nibs and hooked nibs are generally distributed in a plurality of diamond patterns over substantially the entire area of the upper surface and the bottom surface of the mat frame. The orientation of the hooked nibs may be aligned within each diamond pattern. The orientation of the hook in the diamond patterns may differ such that adjacent columns or rows of diamond patterns may have the hooked nibs orientated about 90-degrees from each other.

As discussed above, the hooked nibs on the upper surface of the mat frame are intended to enhance the retention of the mat insert to the mat frame. The hooked nibs on the bottom surface of the mat frame are intended to enhance retention of a floor mat on an underlying carpeted surface of a floorboard to ensure substantial resistance to mat movement due to exertion of lateral forces, while permitting somewhat relatively easy removal of the floor mat for cleaning and other purposes (peel strength).

The elasticity and/or resiliency of the hooked nibs, the configuration (e.g., size and shape) of the hooked nibs, and the spacing of the nibs and hooked nibs, may be chosen for the mat frame in accordance with the present invention so that the mat insert may be repeatedly removed or replaced, and so that the floor mat may be repeatedly removed for cleaning and reinstalled in a vehicle generally without damaging or breaking the loops of the carpeted floor board. The floor mat may have only hooked nibs or a ratio of between about one to four hooked nibs per every ten nibs. Other ratios and patterns thereof are also possible.

A mold for forming the mat frame may comprise a die having apertures for forming the projection portion of the nibs, and grooves in a surface of the die for forming the hook portion of the nibs. A suitable mold may be constructed using the techniques employed in forming the hooked nibs in U.S. Pat. No. 6,238,765 issued to Bailey et al., entitled "Vehicle Floor Mat", the entire subject matter being incorporated herein by reference.

Advantageously, the mat frame and mat insert forming the floor mat may comprise materials from a common chemical family. The olefin family is preferred because of its low moisture retention and low specific gravity. A floor mat in which all components are comprised of either a material from a common chemical family, e.g., olefins, or inert materials, has the additional major advantage of being recyclable, for example, into feedstock for forming subsequent floor mats, without requiring separation of the components.

In addition, the mat insert need not include a carpeted face layer. For example, the face layer may be a solid thermoplastic layer. The hook-retaining layer may also be a suitable woven fabric, e.g., having a broad weave or pattern of interlacing of warp and weft yarns and engageable with the hooked nibs. The mat insert may further be a disposable or interchangeable.

Although various embodiments have been depicted and described in detail herein, it will be apparent to those skilled in the relevant art that modifications, additions, substitutions and the like can be made without departing from the spirit of the present invention and these are, therefore, considered to be within the scope of the present invention as defined in the following claims.

The invention claimed is:

1. A floor mat comprising:
a mat frame comprising a central portion having a plurality of integrally formed upwardly-extending hooked nibs spaced-apart from each other at least about ¼ inch to about 1 inch across substantially an entire top surface of said mat frame, a peripheral edge disposed around said central portion, a plurality of integrally formed downwardly-depending nibs spaced-apart from each other at least about ¼ inch to about 1 inch across substantially an entire bottom surface of said mat frame, and said upwardly-extending nibs comprise a height and said downwardly-depending nibs comprise a depth and wherein said height is less than said depth;
a releasably attachable mat insert having a hook-retaining material extending across substantially an entire bottom surface of said releasably attachable mat insert; and
wherein said plurality of upwardly-extending hooked nibs of said mat frame is releasably engageable with said hook-retaining material of said mat insert.

2. The floor mat of claim 1 wherein said hook-retaining material comprises a nonwoven material.

3. The floor mat of claim 1 wherein said hook-retaining material comprises reticulated foam.

4. The floor mat of claim 1 wherein said mat insert comprises a carpeted face layer attached to said hook-retaining material.

5. The floor mat of claim 1 wherein each of said plurality of hooked nibs comprises a plurality of hooks.

6. The floor mat of claim 1 further comprising a plurality of integrally formed upwardly-extending nibs without hooks.

7. The floor mat of claim 1 wherein at least a portion of said peripheral edge comprises an integrally formed upwardly-extending wall.

8. The floor mat of claim 1 wherein at least a portion of said peripheral edge comprises an inwardly-extending portion spaced-apart from said central portion defining a recess for receiving a peripheral edge of said mat insert.

9. The floor mat of claim 1 wherein at least a portion of said peripheral edge of said mat frame comprises an outwardly and downwardly-extending leg having a bottom portion disposed below a bottom surface of said mat frame to define an open channel.

10. The floor mat of claim 1 wherein said mat frame comprises a plurality of integrally formed downwardly-depending hooked nibs spaced-apart from each other at least about ¼ inch to about 1 inch across substantially an entire bottom surface of said monolithic mat frame.

11. The floor mat of claim 1 wherein said mat frame comprises a plurality of through-holes.

12. The floor mat of claim 1 wherein said mat frame comprises an integrally formed resilient elastomeric polymer.

13. The floor mat of claim 1 wherein said plurality of upwardly-extending hooked nibs further comprise a frustoconical configuration having a height of about 1/32 inch to about 3/10 inch, and at least one outwardly-extending portion extending from a side of said nib of about 0.16 inch.

14. The floor mat of claim 13 wherein said plurality of downwardly-depending nibs further comprise a frustoconical configuration having a height of about 1/32 inch to about 3/10 inch.

15. A mat frame for use in a floor mat with a mat insert, said mat frame comprising:
a central portion having a plurality of integrally formed upwardly-extending hooked nibs spaced-apart from each other at least about ¼ inch to about 1 inch across substantially an entire top surface of said mat frame,
a plurality of integrally formed downwardly-depending nibs spaced-apart from each other at least about ¼ inch to about 1 inch across substantially an entire bottom surface of said mat frame, and
a peripheral edge disposed around said central portion having an integrally formed inwardly-extending portion defining a recess for receiving a peripheral edge of the mat insert, and
wherein said upwardly-extending nibs comprise a height and said downwardly-depending nibs comprise a depth and wherein said height is less than said depth.

16. The monolithic mat frame of claim 15 wherein each of said plurality of upwardly-extending hooked nibs comprises a plurality of hooks.

17. The monolithic mat frame of claim 15 wherein said central portion further comprises a plurality of integrally formed upwardly-extending nibs without hooks.

18. The mat frame of claim 15 wherein at least some of said plurality of integrally formed downwardly-depending nibs comprises integrally formed downwardly-depending hooked nibs.

19. The mat frame of claim 15 wherein at least a portion of said peripheral edge of said mat frame comprises an outwardly and downwardly-extending leg having a bottom portion disposed below said bottom surface of said mat frame to define an open channel.

20. The mat frame of claim 15 wherein said central portion comprises a plurality of through-holes.

21. The mat frame of claim 15 wherein said mat frame comprises a resilient elastomeric polymer.

22. The floor mat of claim 15 wherein said upwardly-extending hooked nibs comprise a frustoconical configuration with a height of about 1/32 inch to about 3/10 inch, and at least one outwardly-extending portion extending from a side of the nib of about 0.16 inch.

23. The floor mat of claim 22 wherein said plurality of downwardly-depending nibs further comprise a frustoconical configuration having a height of about 1/32 inch to about 3/10 inch.

24. A floor mat comprising:
a releasably attachable mat insert having a carpeted face layer and a hook-retaining material extending across substantially an entire bottom surface of said releasably attachable mat insert;
a mat frame comprising:
a central portion having a plurality of integrally formed upwardly-extending hooked nibs spaced-apart from each other at least about 1/4 inch to about 1 inch across substantially an entire top surface of said mat frame,
a plurality of integrally formed downwardly-depending nibs spaced-apart from each other at least about 1/4 inch to about 1 inch across substantially an entire bottom surface of said mat frame, and said upwardly-extending nibs comprise a height and said downwardly-depending nibs comprise a depth and wherein said height is less than said depth, and
a peripheral edge having an inwardly-extending portion defining a recess for receiving a peripheral edge of said mat insert, and an outwardly and downwardly-extending leg having a bottom portion disposed below a bottom surface of said mat frame to define an open channel; and
wherein said plurality of upwardly-extending hooked nibs of said mat frame is releasably engageable with said hook-retaining material of said mat insert.

25. The floor mat of claim 24 wherein said hook-retaining material comprises a nonwoven material.

26. The floor mat of claim 24 wherein said hook-retaining material comprises reticulated foam.

27. The floor mat of claim 24 further comprising a plurality of integrally formed upwardly-extending nibs without hooks.

28. The floor mat of claim 24 wherein said mat frame comprises a plurality of through-holes.

29. The floor mat of claim 24 wherein said mat frame comprises a resilient elastomeric polymer.

30. The floor mat of claim 23 wherein said plurality of upwardly-extending hooked nibs further comprise a frustoconical configuration having a height of about 1/32 inch to about 3/10 inch, and at least one outwardly-extending portion extending from a side of said nib of about 0.16 inch.

31. The floor mat of claim 30 wherein said plurality of downwardly-depending nibs further comprise a frustoconical configuration having a height of about 1/32 inch to about 3/10 inch.

* * * * *

UNITED STATES PATENT AND TRADEMARK OFFICE
CERTIFICATE OF CORRECTION

PATENT NO. : 7,416,771 B2  Page 1 of 1
APPLICATION NO. : 11/116091
DATED : August 26, 2008
INVENTOR(S) : Bailey et al.

It is certified that error appears in the above-identified patent and that said Letters Patent is hereby corrected as shown below:

In the Title item [54] and Col. 1, Line 2:

Delete "MODULATOR INTERCHANGEABLE" and insert -- MODULAR INTERCHANGEABLE --

Claim 16, Col. 6, Line 43: Delete "The monolithic mat frame of" and insert -- The mat frame of --

Claim 17, Col. 6, Line 46: Delete "The monolithic mat frame of" and insert -- The mat frame of --

Claim 30, Col. 8, Line 30: Delete "of claim 23 wherein said" and insert -- of claim 24 wherein said --

Signed and Sealed this

Fourth Day of August, 2009

JOHN DOLL
*Acting Director of the United States Patent and Trademark Office*